(No Model.)　　　　　　　　　　　　　　2 Sheets—Sheet 1.
E. V. GAUTHIER.
SCREW MACHINE CHUCK.

No. 594,077.　　　　　　　　Patented Nov. 23, 1897.

Witnesses.
W. J. Baldwin
E. M. Healy

Inventor
E. V. Gauthier
By
Southgate & Southgate
Attorneys.

(No Model.)
E. V. GAUTHIER.
SCREW MACHINE CHUCK.
No. 594,077. Patented Nov. 23, 1897.
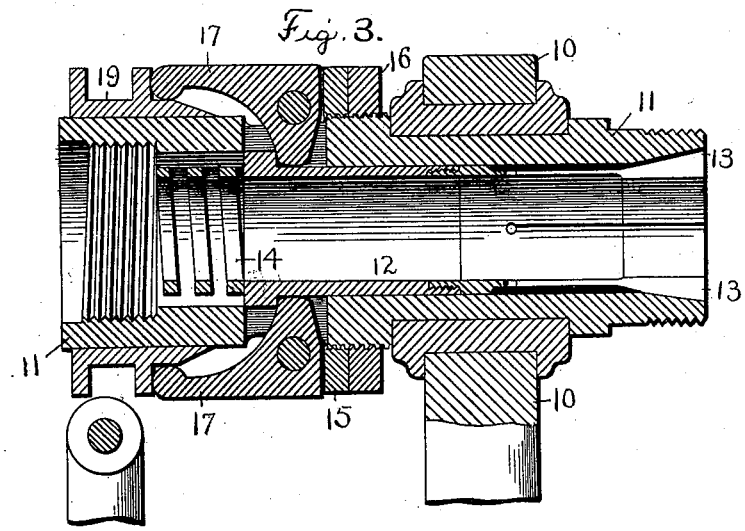
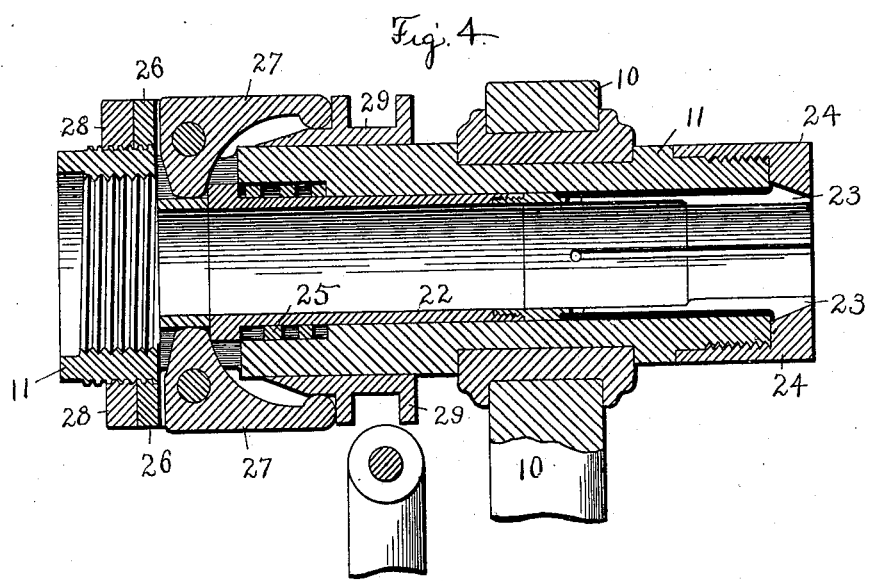
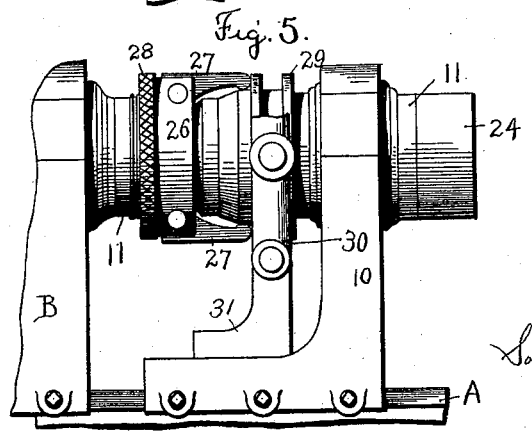
Witnesses
W. J. Baldwin
E. M. Healy
Inventor.
E. V. Gauthier.
By
Southgate & Southgate
Attorneys.

UNITED STATES PATENT OFFICE.

ERNEST V. GAUTHIER, OF WESTBOROUGH, MASSACHUSETTS.

SCREW-MACHINE CHUCK.

SPECIFICATION forming part of Letters Patent No. 594,077, dated November 23, 1897.

Application filed August 9, 1897. Serial No. 647,520. (No model.)

*To all whom it may concern:*

Be it known that I, ERNEST V. GAUTHIER, a citizen of the United States, residing at Westborough, in the county of Worcester and State of Massachusetts, have invented a new and useful Improvement in Screw-Machine Chucks, of which the following is a specification.

My invention relates to an attachment for screw-machines; and the object of my invention is to combine the main spindle of a screw-machine with a chuck that can be operated while the machine is running, so that the full inside diameter of the main spindle may be utilized.

To this end my invention consists of the parts and combinations of parts, as hereinafter described, and more particularly pointed out in the claims at the end of this specification.

Figure 1:
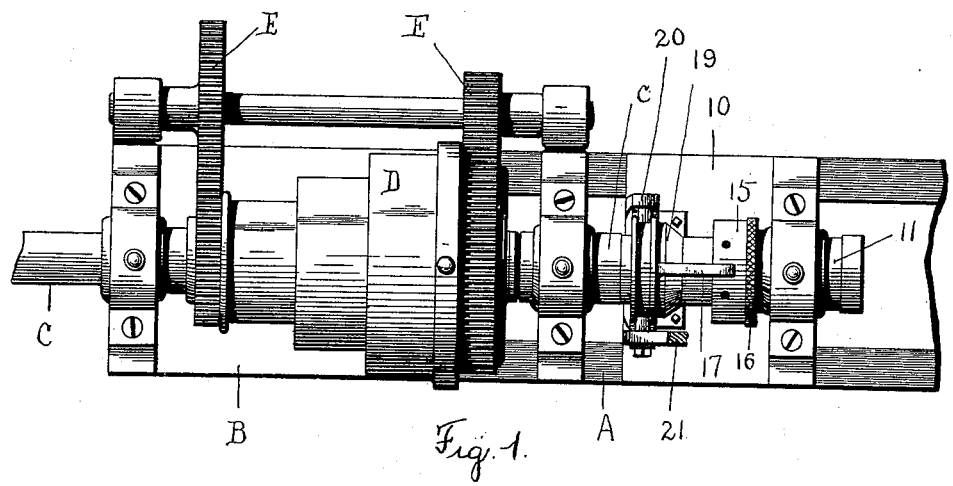
Figure 2:
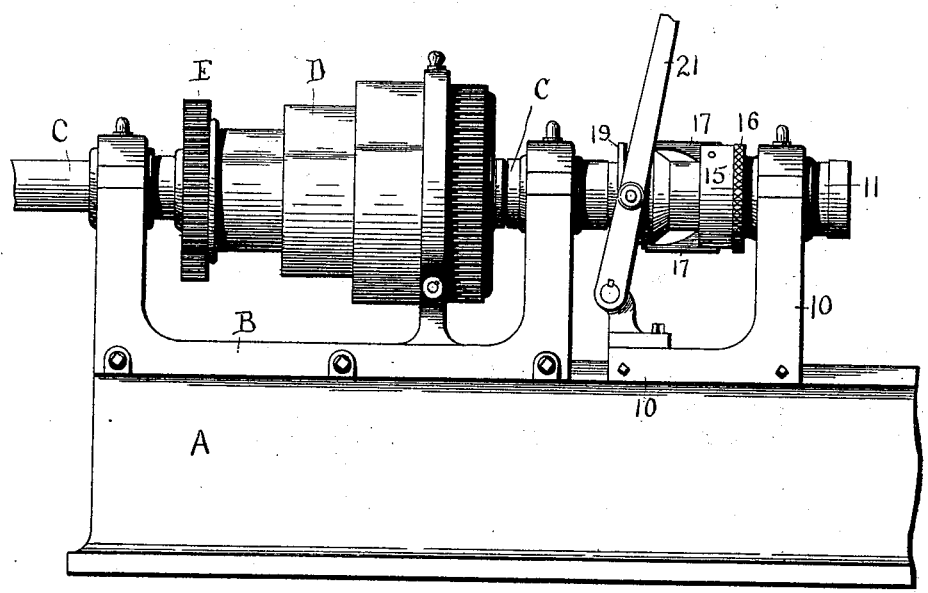

In the accompanying two sheets of drawings, Figure 1 is a partial plan view of a screw-machine provided with an attachment constructed according to my invention. Fig. 2 is a partial side view of the same. Fig. 3 is an enlarged sectional view illustrating the form of chuck which I preferably employ. Fig. 4 is a sectional view illustrating a slightly-modified form of chuck, and Fig. 5 is a partial side view of a screw-machine provided with an attachment embodying said modified form of chuck.

The chucks employed for holding the rod or work in a screw-machine are of two different styles, first, the ordinary movable jawed chuck, which is adjusted by means of a wrench or key, the use of which requires the stoppage of the machine whenever the work is to be adjusted, and, second, the so-called "automatic" chuck, which can be adjusted while the machine is running by means of a longitudinally-movable sleeve.

Where the so-called "automatic" chuck is employed in a screw-machine, the longitudinally-movable sleeve has heretofore been located inside of the main spindle. In a screw-machine thus equipped this location of the chuck-operating sleeve reduces the capacity of the machine from one-half to five-eighths of an inch—for example, what is known as a "No. 3 machine" is capacitated to utilize the full inside diameter of the main spindle and to work upon stock two and one-eighth inches in diameter when using the ordinary hand-operated two-jawed chuck, while the same machine is only capacitated to handle one and one-half-inch stock when provided with the ordinary so-called "automatic" chuck.

The especial object of my present invention is, therefore, to provide a screw-machine attachment which will combine the main spindle of a screw-machine with a so-called "automatic" chuck, so as to permit the utilization of the full inside diameter of the main spindle.

Screw-machines provided with attachments constructed according to my invention have been found to be especially well adapted for making bicycle parts.

Among the manufacturers of bicycles there has been a constant tendency to increase the diameter of the various pieces, and it now frequently happens that bicycle-makers find their screw-machines too small to handle the large-sized hubs or other parts which they desire to employ when equipped with the ordinary form of so-called "automatic" chuck. In such cases it is necessary either to employ the old form of hand-operated chucks, which are much slower and less efficient in their action, or to purchase additional screw-machines of larger sizes, while, as a matter of fact, the smaller-sized screw-machines are amply powerful and strong enough to do the machine-work required and can be handled to better advantage and worked more quickly than the larger and heavier machines.

A screw-machine attachment constructed according to my invention comprises a bearing-piece adapted to be detachably secured to the bed of the machine, a spindle extension journaled in said bearing-piece, means for detachably securing the spindle extension to the hollow main spindle of the screw-machine, and a chuck carried by the spindle extension, said parts being arranged so that the full inside diameter of the main spindle of the screw-machine may be utilized.

Referring to the drawings and in detail, A designates the bed, and B the head-stock, of a screw-machine. Journaled in the head-stock B is the hollow main spindle C. The spindle-driving mechanism, as illustrated, comprises a step-cone D and back gears E E. These parts may be of any ordinary or approved construction and need not be herein described at length.

Removably mounted on the bed of the machine is a bearing-piece or supplemental head-stock 10. Journaled in the bearing-piece 10, by means of an ordinary split box, is a spindle extension 11. The spindle extension 11 is threaded at its inner end, so that it may be detachably secured to the main spindle C of the machine, and is of sufficient diameter, so that it may be provided with a so-called "automatic" chuck of sufficient capacity to handle stock up to the full-sized inside diameter of the main spindle C.

The form of chuck which I preferably employ is most clearly illustrated in Fig. 3. As shown in this figure, a longitudinally-movable sleeve 12 is splined in the spindle extension 11, and is provided with a removable end piece or spring-collar, which is quartered or split and has a conical section 13, engaging a corresponding conical socket in the end of the spindle extension 11. The sleeve 12 is normally forced outwardly by means of a coiled spring 14.

Adjustably threaded onto the spindle extension 11 is a piece or collar 15, having bell-crank levers 17 for engaging the sleeve 12 pivoted therein. The collar or sleeve 15 may be clamped in its adjusted position by means of a check-nut 16.

An operating-collar 19 is fitted onto the spindle extension 11 and is provided with a conical cam-section for operating the bell-crank lever 17. The operating-collar 19 may be shifted longitudinally on the spindle extension 11 by means of pins extending from a yoke-piece 20, which yoke-piece is pivotally mounted in a bracket secured to the bearing-piece 10, and may be moved or shifted by an operating-handle 21.

In this construction the clutch is normally held open by means of the coiled spring 14, and may be closed or clamped into engagement with the stock to be operated upon by moving the handle 21 to draw the sleeve 12 toward the head-stock of the machine.

In some cases, instead of employing a draw-in clutch, which is closed by moving its operating-sleeve toward the head-stock of the machine, I may employ a push-out clutch, which is closed by pushing its operating-sleeve away from the head-stock, and I have illustrated such a construction in Figs. 4 and 5. As shown in these figures, a longitudinally-movable sleeve 22 is mounted inside of the spindle 11, and is provided at its end with a removable spring-collet or quartered piece, having an outwardly-inclined conical section 23 for engaging a corresponding socket in a cap 24, removably threaded onto the spindle extension 11. The sleeve 22 is normally forced back by means of a coiled spring 25, and may be pushed forward to close the chuck by means of bell-crank levers 27, pivoted in a collar 26, adjustably threaded onto the spindle extension 11, the collar 26 being clamped in its adjusted position by a check-nut 28.

The operating-sleeve 29 is provided with a conical or cam section for operating the bell-crank lever 27 and may be shifted by means of pins carried by a yoke-piece 30, pivoted in a bracket 31, secured on the bearing-piece 10.

I am aware that changes may be made in the construction of my screw-machine attachment by those who are skilled in the art, and that the clutch-operating devices can be variously arranged and operated. I do not wish, therefore, to be limited to the forms which I have shown and described; but What I do claim, and desire to secure by Letters Patent of the United States, is—

1. In a screw-machine, the combination of the head-stock, the hollow main spindle journaled therein, a removable bearing-piece, a spindle extension journaled in said bearing-piece, means for detachably connecting the main spindle and the spindle extension, and a chuck carried by the spindle extension, substantially as described.

2. An attachment for increasing the capacity of screw-machines, comprising a bearing-piece adapted to be detachably secured to the bed of the machine, a spindle extension journaled in said bearing-piece, means for detachably securing the spindle extension to the hollow main spindle of the machine, and a chuck carried by the spindle extension, whereby the full inside diameter of the main spindle may be utilized without stopping the machine, substantially as described.

3. An attachment for screw-machines, comprising a bearing-piece adapted to be detachably secured to the bed of the machine, a spindle extension journaled in said bearing-piece and adapted to be removably threaded to the hollow main spindle of the machine, and a chuck carried by said spindle extension, said chuck comprising a longitudinally-movable sleeve, a spring for forcing the sleeve in one direction, bell-crank levers for moving the sleeve in the opposite direction, an operating-sleeve having a cam-section for actuating said bell-crank levers, and a yoke-piece for shifting said actuating-sleeve, substantially as described.

4. An attachment for screw-machines comprising a bearing-piece 10, a spindle extension 11 journaled therein, and having a threaded socket for engaging the main spindle of the screw-machine, and a draw-in chuck mounted in said spindle extension, said draw-in chuck comprising a longitudinally-movable sleeve 12, a detachable end piece or spring-collet having a conical operating-section 13, a spring 14 for forcing the sleeve 12 in one direction, an adjustable collar 15, check-nuts 16 for holding said collar in its adjusted position, bell-crank levers 17 pivotally mounted in the collar 15, an operating-sleeve 19 for actuating said bell-crank lever 17, and a yoke for shifting said actuating-sleeve, substantially as described.

In testimony whereof I have hereunto set my hand in the presence of two subscribing witnesses.

ERNEST V. GAUTHIER.

Witnesses:
 PHILIP W. SOUTHGATE,
 JOHN F. CROWELL.